(12) United States Patent
Kuwata

(10) Patent No.: US 7,090,813 B2
(45) Date of Patent: Aug. 15, 2006

(54) METHOD FOR PRODUCING CYCLIC CHLOROPHOSPHAZENE OLIGOMERS

(75) Inventor: Kotaro Kuwata, Kurashiki (JP)

(73) Assignee: Asaki Kasei Chemicals Corporation, Tokyo (JP)

( * ) Notice: Subject to any disclaimer, the term of this patent is extended or adjusted under 35 U.S.C. 154(b) by 74 days.

(21) Appl. No.: 10/753,437

(22) Filed: Jan. 9, 2004

(65) Prior Publication Data

US 2004/0146443 A1    Jul. 29, 2004

(30) Foreign Application Priority Data

Jan. 10, 2003  (JP) .............................. 2003-004153

(51) Int. Cl.
*C01B 21/83* (2006.01)

(52) U.S. Cl. .................................................... 423/300
(58) Field of Classification Search ................. 423/300
See application file for complete search history.

(56) References Cited

U.S. PATENT DOCUMENTS

| | | | |
|---|---|---|---|
| 3,367,750 A | 2/1968 | Jaszka et al. | |
| 3,860,693 A | 1/1975 | Graham | |
| 3,952,086 A * | 4/1976 | Fieldhouse | .................. 423/300 |
| 4,065,546 A * | 12/1977 | Kao | ........................... 423/300 |
| 4,241,034 A * | 12/1980 | Kolich | ....................... 423/300 |
| 4,256,715 A | 3/1981 | Kinoshita et al. | |
| 4,382,914 A | 5/1983 | Horie et al. | |
| 4,795,621 A | 1/1989 | Okamoto et al. | |

OTHER PUBLICATIONS

Emsley et al., J. Chem. Soc. (A), pp. 768-772, (1971), no month.

* cited by examiner

*Primary Examiner*—Wayne A. Langel
(74) *Attorney, Agent, or Firm*—Birch, Stewart, Kolasch & Birch, LLP

(57) ABSTRACT

The present invention provides a method for producing cyclic chlorophosphazene oligomers, in particular the trimer and tetramer, in a high yield and selectivity. The method for producing cyclic chlorophosphazene oligomers involves the reaction between chlorinated phosphorus and ammonium chloride in the presence of a reaction catalyst, wherein 1) moisture is present in the reaction system at a molar fraction of $5\times10^{-3}$ or less based on the total moles of the chlorinated phosphorus added to the reaction system, and 2) the ammonium chloride has an average particle size of 10 μm or less and the value of particle size distribution of 2 or more, estimated by the Rosin-Rammler equation.

7 Claims, No Drawings

METHOD FOR PRODUCING CYCLIC CHLOROPHOSPHAZENE OLIGOMERS

This Non-provisional application claims priority under 35 U.S.C. § 119(a) on Patent Application No(s). 2003-004153 filed in Japan on Jan. 10, 2003, the entire contents of which are hereby incorporated by reference.

BACKGROUND OF THE INVENTION

The present invention relates to a method for producing cyclic chlorophosphazene oligomers, more particularly a method for producing cyclic chlorophosphazene oligomers in a high yield and selectivity, in particular for the trimer and tetramer, by reacting chlorinated phosphorus with ammonium chloride in the presence of a reaction catalyst, while controlling the moisture content of the reaction system, and average particle size and particle size distribution of the ammonium chloride so as to produce minimal amounts of linear compounds.

PRIOR ART

Phosphazene oligomers are known starting materials for phosphazene polymers commonly referred to as "inorganic rubber." Various derivatives of phosphazene oligomers and polymers are being used in widely varying areas, e.g., plastics and additives therefor, rubbers, fertilizers and medicines. More recently, in particular, the manufacture of flame-retardant or non-combustible plastics with a non-halogen flame retardant has been attracting much social attention, and flame-retardant and non-combustible materials are very promising areas for the derivatives of phosphazene oligomers and polymers, because of their remarkably excellent characteristics, e.g., high flame retardancy, and higher resistance to hydrolysis and heat than conventional phosphoric esters. Moreover, their industrialization has encouraged their use as flame retardants for electronic materials, e.g., those for printed boards and semiconductor encapsulation, because resin compositions incorporated with the derivatives exhibit a very low dielectric constant.

A chlorophosphazene oligomer can be generally represented by the chemical formula (1). It is a compound discovered by Liebig in 1834 as a by-product of phosphorus nitride amide $NP(NH_2)_2$ synthesis by the reaction between ammonium chloride and phosphorus pentachloride:

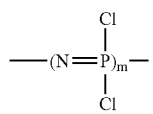

(1)

(wherein, "m" is an integer of 3 or more).

The chemical formula (1) gives a cyclic chlorophosphazene trimer when "m" is 3, and tetramer when "m" is 4. These compounds are represented by the chemical formulas (2) and (3):

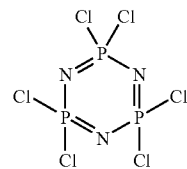

(2)

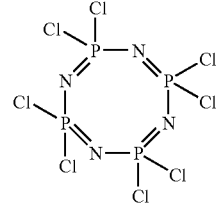

(3)

These cyclic chlorophosphazene trimers and tetramers have much more applicable areas and demands than other chlorophosphazene oligomers, because they can be polymerized into straight chain polymers by ring-opening polymerization without causing side reactions, e.g., crosslinking, and less deterioration of the properties of resins in which they are incorporated after being transformed into derivatives.

The production of chlorophosphazene oligomers has been extensively studied since the discovery by Liebig. The representative chlorophosphazene oligomer synthesis methods developed so far include those that use as the phosphorus source (1) phosphorus pentachloride, (2) phosphorus trichloride, (3) white phosphorus or (4) phosphorous nitride. However, the extensive studies made so far for the synthesis of chlorophosphazene oligomers in a high yield have failed to achieve the desired object.

The following techniques have been developed. U.S. Pat. No. 4,382,914 discloses a method for the reaction between phosphorus pentachloride and ammonium chloride in the presence of a polyvalent metallic compound catalyst to recover products containing a cyclic chlorophosphazene oligomer. This method produces the trimer and tetramer in an insufficient yield based on phosphorus pentachloride and requires a long reaction time, although giving the trimer and tetramer in a relatively high selectivity.

U.S. Pat. No. 4,256,715 discloses a method for the reaction between phosphorus pentachloride and ammonium chloride having a particle size in a certain range in the presence of a polyvalent metallic compound catalyst, in which phosphorus trichloride and chlorine are provided for the reaction system at a controlled rate to prevent the phosphorus pentachloride/ammonium chloride concentration ratio in the reaction system from increasing to an excessive level, in order to enhance the trimer and tetramer production yields. This prior art is silent about moisture content in the reaction system. It specifies the particle size of ammonium chloride, but it is crushed to an insufficient extent to generate products containing linear compounds.

U.S. Pat. No. 4,795,621 discloses a method for the reaction between phosphorus pentachloride and ammonium chloride in the presence of a polyvalent metallic compound having Lewis acidity and a pyridine derivative, e.g., quinoline, as catalysts. This method gives the trimer in a particularly high selectivity, but the yield thereof is still insufficient. However, industrialization of this method is difficult because of several disadvantages that many unknown components are contained in the reaction product, a large quantity of the pyridine derivative as the co-catalyst is required, and complicated procedures are required for recovering the pyridine derivative from the product and solvent.

U.S. Pat. No. 3,860,693 discloses a method for producing a cyclic chlorophosphazene by the reaction between fine particles of ammonium chloride and chlorinated phosphorus, where ammonium and hydrogen chloride gas are incorporated in the reaction system to produce the fine particles of ammonium chloride. The specification is also silent about moisture content in the reaction system and particle size distribution of ammonium chloride. Moreover, the reaction between ammonium and hydrogen chloride gas in the reaction system is difficult to control, leading to unstable average particle size and particle size distribution of the ammonium chloride particles formed. Therefore, this method involves problems of unstable trimer and tetramer yields and formation of linear compounds, resulting from an unstable reactivity of ammonium chloride and chlorinated phosphorus.

SUMMARY OF THE INVENTION

It is an object of the present invention to provide a method for producing cyclic chlorophosphazene oligomers in a high yield and selectivity, in particular for the trimer and tetramer, by solving the problems involved in the conventional techniques.

In production of a chlorophosphazene oligomer, the factors to be controlled for producing the cyclic chlorophosphazene oligomers, in particular the trimer and tetramer, in a high yield are shown in the following.
i) Moisture content in the reaction system
ii) Average particle size and particle size distribution of ammonium chloride First, moisture content in the reaction system is described. It is known that both chlorinated phosphorus and ammonium chloride as the starting compounds are hydrolysable (and hygroscopic). However, no literature has discussed control of moisture in the reaction system.

Chlorinated phosphorus as one of the starting compounds is very hydrolysable, reacting with a trace quantity of moisture to be converted into phosphorus oxychloride, and is hydrolyzed into phosphoric acid in the presence of an excessive quantity of moisture for chlorinated phosphorus. Therefore, chlorinated phosphorus may be notably lost by hydrolysis, depending on the quantity of moisture present in the reaction system, leading to a decreased yield of chlorophosphazene oligomers.

On the other hand, ammonium chloride as the other starting compound is notably hydrolyzed into ammonia and hydrogen chloride, when exposed to high temperature in the presence of moisture, which also leads to decreased yield of chlorophosphazene oligomers. Moreover, the hygroscopic property of ammonium chloride causes agglomeration of its particles to decrease its surface area and hence its reactivity. In addition, deposition of the water molecules on the ammonium chloride particle surfaces changes the interfacial conditions between the surfaces and solvent, and hence changes or decreases reactivity of ammonium chloride. This, in turn, causes problems, e.g., decreased chlorophosphazene oligomer yield, and unstable chlorophosphazene composition produced, i.e., unstable trimer/tetramer/cyclic oligomers of pentamer or higher/linear compounds ratio in the products.

For production of chlorophosphazene, a metallic oxide or chloride has been typically used as a catalyst, and a catalyst of strong Lewis acidity has been believed to be particularly suitable. However, a metallic chloride, in particular a compound of strong Lewis acidity (e.g., aluminum chloride), is highly hydrolysable and hydrolyzed in the presence of moisture in the reaction system so as to lose its catalytic activity. A catalyst is present in the reaction system frequently in a much smaller quantity than the starting compound and solvent, by which is meant that the effect of moisture on the catalyst in the reaction system is very severe to notably decrease cyclic chlorophosphazene oligomer yield and extend reaction time.

Next, the particle size of ammonium chloride is discussed. In the common process for producing chlorophosphazene oligomers by the reaction between ammonium chloride and chlorinated phosphorus, ammonium chloride is insoluble in the reaction solvent but is present in the form of a slurry in the reaction system. It is therefore considered that the reaction between ammonium chloride and chlorinated phosphorus proceeds on the surface of ammonium chloride, from which it is easily predicted that ammonium chloride exhibits increased reactivity as its average particle size decreases. However, when the average particle size and particle size distribution of ammonium chloride significantly fluctuate by reaction batches, the problem of unstable chlorophosphazene oligomer composition produced, i.e., unstable trimer/tetramer/cyclic oligomers of pentamer or higher/linear compounds/unreacted components ratio in the products, will be caused even when the average particle size is decreased, as a result of the unstable reactivity of ammonium chloride. Moreover, the hygroscopic property of ammonium chloride causes agglomeration of its particles to increase its apparent particle size and widen its particle size distribution, depending on the quantity of moisture present in the reaction system, as discussed above, even when ammonium chloride initially has a small average particle size and narrow particle size distribution. This causes problems, e.g., decreased or unstable reactivity of ammonium chloride.

The rate of providing chlorinated phosphorus for the reaction system and type of reaction solvent used are also important factors to be controlled, in addition to the above-described two factors, for producing chlorophosphazene trimer and tetramer in a high yield. As discussed above, the reaction field in which the reaction between chlorinated phosphorus and ammonium chloride proceeds is the surface of ammonium chloride present in the form of a slurry in the reaction system. Therefore, it is considered that the reaction between ammonium chloride and chlorinated phosphorus on the ammonium chloride particle surfaces is the rate-determining step in the ring formation reaction. However, the inter-molecular growth reaction will proceed in preference to the intra-molecular ring formation reaction in the presence of a largely excessive quantity of chlorinated phosphorus in the reaction system, causing problems of decreased yield of the cyclic chlorophosphazene trimer and tetramer as the target products accompanied by increased production of other cyclic oligomers and linear compounds. When the reaction solvent enhances wettability of the ammonium chloride particle surfaces in the slurry form, the ring formation reaction proceeds faster, because of increased possibility of contact between chlorinated phosphorus and ammonium chloride.

The inventors of the present invention have surprisingly found, after having extensively studied to achieve the object of the present invention noting the above-described three factors to be controlled for producing the cyclic chlorophosphazene oligomers in high yield, that the oligomers, in particular trimer and tetramer, can be produced in a remarkably high yield and selectivity by controlling the moisture content in the reaction system, the average particle size and particle size distribution of ammonium chloride, and the rate of providing chlorinated phosphorus for the reaction system, thereby achieving the present invention.

The present invention includes the following aspects:

[1] A method for producing cyclic chlorophosphazene oligomers, comprising the reaction between chlorinated phosphorus and ammonium chloride in the presence of a reaction catalyst, wherein
1) moisture is present in the reaction system at a molar fraction of $5 \times 10^{-3}$ or less based on the total moles of the chlorinated phosphorus provided for the reaction system, and
2) the ammonium chloride has an average particle size of 10 μm or less and the value of particle size distribution of 2 or more, estimated by the Rosin-Rammler equation.

[2] The method for producing cyclic chlorophosphazene oligomers according to [1], wherein moisture is present in the reaction system at a molar fraction of $1 \times 10^{-3}$ or less based on the total moles of the chlorinated phosphorus provided for the reaction system.

[3] The method for producing cyclic chlorophosphazene oligomers according to [1], wherein the ammonium chloride has an average particle size of 2.5 μm or less.

[4] The method for producing cyclic chlorophosphazene oligomers according to [1] comprising adding the chlorinated phosphorus to the ammonium chloride incorporated beforehand into the reaction system, wherein the chlorinated phosphorus is provided for the reaction system at $5 \times 10^{-2}$ to 5 moles/hour per mole of the ammonium chloride incorporated beforehand into the reaction system.

[5] The method for producing cyclic chlorophosphazene oligomers according to [1] comprising adding the chlorinated phosphorus to the ammonium chloride incorporated beforehand into the reaction system, wherein the chlorinated phosphorus is provided for the reaction system at 0.1 to 2 moles/hour per mole of the ammonium chloride incorporated beforehand into the reaction system.

[6] The method for producing cyclic chlorophosphazene oligomers according to [1], wherein at least one reaction solvent selected from the group consisting of monochlorobenzene and dichlorobenzene is used.

[7] The method for producing cyclic chlorophosphazene oligomers according to [1], wherein dichlorobenzene is used as a reaction solvent.

PREFERRED EMBODIMENTS OF THE INVENTION

The best embodiments for carrying out the present invention are described in detail.

In the present invention, an allowable moisture content in the reaction system for producing cyclic chlorophosphazene trimer and tetramer from chlorinated phosphorus and ammonium chloride in a high yield and a high selectivity is $5 \times 10^{-3}$ mole or less per mole of chlorinated phosphorus (molar fraction of $5 \times 10^{-3}$ or less based on the total moles of chlorinated phosphorus provided for the reaction system), preferably $1 \times 10^{-3}$ mole or less per mole of chlorinated phosphorus (molar fraction of $1 \times 10^{-3}$ or less based on the total moles of chlorinated phosphorus provided for the reaction system). The cyclic chlorophosphazene trimer and tetramer will be produced in a reduced yield and selectivity at a moisture content in the reaction system of more than $5 \times 10^{-3}$ moles per mole of chlorinated phosphorus. In the present invention, moisture content in the reaction system means the content of moisture contained in the reaction solution, total moisture including that present in the starting compounds, catalyst, solvent and inert gases, and that attaching to the reactor internal surfaces.

The method for controlling moisture content is not limited. For example, when moisture is to be removed from the solvent, the solvent may be dried with a dehydrating agent inert to the solvent (e.g., molecular sieve, calcium hydride, metallic sodium, diphosphorus pentoxide or calcium chloride), and then distilled, as required. When moisture adsorbed by ammonium chloride is to be removed, ammonium chloride may be dried by a hot air or vacuum drier under normal pressure or a vacuum at 50 to 150° C. When moisture attaching to the reactor internal surfaces is to be removed, the reactor inside may be heated under normal pressure or a vacuum, or dried gas may be passed through the reactor system at normal or elevated temperature.

The reaction for the present invention is preferably effected in an inert gas atmosphere, e.g., in a dried nitrogen or argon atmosphere.

Ammonium chloride for the present invention has an average particle size of 10 μm or less, preferably 5 μm or less, more preferably 2.5 μm or less, and the value of particle size distribution of 2 or more, estimated by the Rosin-Rammler equation.

The Rosin-Rammler equation is defined by the equation (1), which is a function representing particle size distribution of crushed coal particles proposed by Rosin and Rammler. In addition, a value indicating particle size distribution according to the invention is given by n in the equation (3).

<Rosin-Rammler Equation>

$$R = 100 \exp(-bD^n) \qquad (1)$$

(wherein, D is a size of a certain particle; R is the percentage (%) of particles larger than D; "n" is a distribution constant; and "b" is a constant).

Substituting the equation (1) by $b = 1/(De)^n$ yields the equation (2):

$$R = 100 \exp\{-(D/De)^n\} \qquad (2)$$

(wherein, De is particle size characteristic number).

The equation (2) is transformed into the common logarithmic function:

$$\log\{\log(100/R)\} = n \cdot \log D + C \qquad (3)$$

(wherein, $C = \log(\log e) - n \cdot \log De$)

Plotting the measurement results in the Rosin-Rammler chart with log D (related to particle size) on the x-axis and $\log\{\log(100/R)\}$ (related to cumulative distribution) on the y-axis yields a straight line, where the slope "n" represents uniformity of the particle size. In other words, the larger the slope "n", the more uniform the particle size, or the narrower the particle size distribution.

Ammonium chloride loses reactivity when its average particle size exceeds 10 μm, not only decreasing the production yield of the trimer and tetramer as the target products but also increasing production of linear compounds as by-products. When the particle size distribution is less than 2, estimated by the Rosin-Rammler equation, the particle size distribution is excessively broad to make ammonium chloride reactivity uneven and the reaction production composition unstable.

The method for finely crushing ammonium chloride is not limited. For example, it may be crushed by a ball mill, agitation mill, roller mill, jet mill or impact crusher. Ammonium chloride exhibits hygroscopic property, which is more noted as it is finely crushed. As a result, it is more difficult to crush, or the finely crushed particles will reagglomerate with each other to nullify the effect of crushing. Therefore, it is preferable that the crushing is carried out in a moisture-free, dried atmosphere, and crushed particles are stored in a dried atmosphere.

In the present invention, commercial ammonium chloride may be used. However, it is preferably sufficiently dried before being crushed, viewed from its crushability. The drying method is not limited. For example, it may be dried by a hot air or vacuum drier at 50 to 150° C. for around 1 to 5 hours. In the present invention, ammonium chloride is preferably provided directly for the reaction system after being finely crushed in a dried atmosphere.

In the present invention, ammonium chloride is preferably provided for the reaction system in an excess amount of chlorinated phosphorus added thereto, at 1.0 to 2.0 moles per mole of chlorinated phosphorus, more preferably 1.05 to 1.5 moles.

In the present invention, chlorinated phosphorus is added to the reaction system at $5 \times 10^{-2}$ to 5 moles/hour per mole of ammonium chloride, preferably 0.1 to 2 moles/hour, when added to ammonium chloride incorporated beforehand into the reaction system. Production of cyclic oligomers of pentamer or higher and linear compounds will increase when it is provided at above 5 moles/hour. When it is provided at below $5 \times 10^{-2}$ moles/hour, on the other hand, the reaction will proceed slowly and require a longer reaction time.

As chlorinated phosphorus, phosphorus pentachloride may be directly used, or it may be produced by the action of chlorine on phosphorus trichloride, white phosphorus or yellow phosphorus, before the reaction or in the reaction system. Of these, phosphorus pentachloride and chlorinated phosphorus produced by the action of chlorine on phosphorus trichloride are preferable.

The solvent for the present invention is at least one selected from the group consisting of monochlorobenzene, o-dichlorobenzene, m-dichlorobenzene and p-dichlorobenzene. Use of the solvent allows the reaction to proceed at a higher temperature. Of these solvents, o-dichlorobenzene, m-dichlorobenzene and p-dichlorobenzene are more preferable for producing the trimer and tetramer in a higher yield and selectivity.

The organic solvent is incorporated into the reaction system preferably at 0.1 to 100 parts by weight per part by weight of chlorinated phosphorus added to the reaction system, more preferably 1 to 20 parts by weight. When it is incorporated at below 0.1 parts by weight, production of cyclic oligomers of pentamer or higher and linear compounds may increase as a result of excessively high starting material concentrations in the reaction system. On the other hand, incorporation of the organic solvent at above 100 parts by weight may cause problems, e.g., increased utility cost and increased size of the reaction facilities.

In the present invention, the reaction between chlorinated phosphorus and ammonium chloride is carried out in the presence of a catalyst. Any catalyst which has been used for the above reaction may be used for the present invention. The catalysts useful for the present invention include metallic oxides, e.g., MgO and ZnO; metallic peroxides, e.g., $ZnO_2$ and $MgO_2$; metallic chlorides, e.g., $MgCl_2$ and $ZnCl_2$; metallic sulfides, e.g., ZnS; metallic hydroxides, e.g., $Mg(OH)_2$ and $Al(OH)_3$; metallic salts of organic carboxylic acids, e.g., $Ba(CH_3COO)_2$ and $Zn[CH_3(CH_2)_{16}COO]_2$; metallic salts of perfluoroalkanesulfonic acid; and layered silicates, e.g., smectite, kaolin, mica, talc and wollastonite.

Of these, preferable ones are metallic oxides, e.g., MgO, CrO, $Fe_2O_3$, CuO, ZnO, CdO, $Al_2O_3$, $Ga_2O_3$, $In_2O_3$, $SiO_2$, $La_2O_3$, $Ce_2O_3$, $Pr_6O_{11}$, $Nd_2O_3$, $Pm_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$ and $Lu_2O_3$; metallic chlorides, e.g., $MgCl_2$ and $ZnCl_2$; and metallic salts of perfluorosulfonic acid, e.g., $Mg(CF_3SO_3)_2$, $Zn(CF_3SO_3)_2$ and $Gd(CF_3SO_3)_3$. These catalysts may be used either individually or in combination in any proportion.

The catalyst is incorporated into the reaction system preferably at $10^{-5}$ to 1 mole per mole of chlorinated phosphorus added to the reaction system, more preferably $10^{-3}$ to $10^{-1}$ moles. At below $10^{-5}$ moles, the reaction may need a long time before it is completed, and the trimer and tetramer may not be produced in a high yield and selectivity, to increase the production of cyclic oligomers of pentamer or higher and linear compounds. On the other hand, increasing the catalyst quantity above 1 mole will no longer increase the production yield, by which is meant that the catalyst has little effect above that level.

In the present invention, pyridine, quinoline and a derivative thereof, known as a compound working as a catalyst, may be incorporated into the reaction system in combination with the above catalyst. The pyridine derivatives useful for the present invention include 2-hydroxypyridine, 3-hydroxypyridine, 4-hydroxypyridine, 2,6-dihydroxypyridine, 3-hydroxy-6-methylpyridine, 2-chloropyridine, 3-chloropyridine, 2,6-dichloropyridine, α-picoline, β-picoline, γ-picoline, lutidine and methylethylpyridine. The quinoline derivatives include 2-methylquinoline, 3-methylquinoline, 4-methylquinoline, 5-methylquinoline, 6-methylquinoline, 7-methylquinoline, 8-methylquinoline, 2-chloroquinoline, 3-chloroquinoline, 4-chloroquinoline, 5-chloroquinoline, 6-chloroquinoline, 2,3-dichloroquinoline, 2-methyl-4-bromoquinoline, 3-chloroisoquinoline and 8-chloroisoquinoline. These may be used either individually or in combination in any proportion.

The content of pyridine, quinoline or a derivative thereof is not limited. However, it is preferably $10^{-2}$ to 1 mole per mole of chlorinated phosphorus.

The reaction method may be selected from the various procedures known in the art. For example, ammonium chloride and catalyst are put in a reaction solvent, to which phosphorus pentachloride dissolved in an organic solvent may be added dropwise under heating and stirring, or to which chlorine and phosphorus trichloride or white phosphorus are added also under heating and stirring.

The reaction temperature is not limited. However, it is preferably 100 to 200° C., more preferably 120 to 180° C. At below 100° C., the reaction may not proceed satisfactorily, or may require long time before it is completed. At above 200° C., on the other hand, chlorinated phosphorus may be sublimated excessively to decrease chlorophosphazene oligomer yield, or produce, in addition to the trimer and tetramer, cyclic oligomers of pentamer or higher and linear compounds in an increased yield.

In the present invention, the reaction system may be purged with an inert gas, e.g., nitrogen, or evacuated by a vacuum pump or aspirator, in order to drive off hydrogen chloride gas formed out of the system.

The progress of the reaction process can be confirmed by monitoring hydrogen chloride gas formed by the reaction between chlorinated phosphorus and ammonium chloride. The reaction process may be terminated when no hydrogen chloride gas is evolved, or continuously stirred for maturing thereafter to complete the reaction. Then, the resultant stream is filtered to remove excess ammonium chloride, and distilled to remove the solvent, to obtain the product substantially composed of cyclic chlorophosphazene oligomers.

The present invention is described in more detail by Examples and Comparative Examples, which by no means limit the present invention.

The analytical procedures and the like adopted in the Examples and Comparative Examples are described below.

(Gel Permeation Chromatography (GPC))

The cyclic chlorophosphazene oligomer composition was determined by gel permeation chromatography (GPC) using the internal standard method. In the analysis, when the composition ratios of the cyclic oligomers accounted for less than 100%, it was judged that the remainder was composed of components derived from unreacted chlorinated phosphorus or linear compounds. The GPC conditions are described below.

Analyzer: HLC-8220, GPC supplied by Tosoh Corp.
Columns: TSKgel Super™ 1000×2
    TSKgel Super™ 2000×2
    TSKgel Super™ 3000×1
    TSKguard column SuperH-L™
    All supplied by Tosoh Corp.
Column temperature: 40° C.
    Elution agent: Chloroform
    Elution rate: 0.5 mL/minute
    Internal standard: Toluene (Solvent)

The solvent used in the Examples was a commercial one of special grade (supplied by Wako Pure Chemical Industries, Ltd.) dried with diphosphorus pentoxide and by molecular sieve, and then distilled. The solvent for the Comparative Examples was an as-received commercial one.

(Analysis of Moisture Content)

Moisture content in the reaction system was determined by a Karl Fischer moisture analyzer equipped with an evaporator under the following conditions.

Analyzer: CA-100 for analyzing trace quantities of moisture (supplied by Mitsubishi Chemical Corp.)
    (Moisture evaporator: VA-100, supplied by Mitsubishi Chemical Corp.)
    Analytical procedure: Moisture evaporation-coulometric titration The sample in a boat was put in an evaporator (VA-100) heated at 120° C., and moisture evaporated in a flow of nitrogen (300 mL/minute) was collected in a titration cell for the analysis of the amount thereof.

Reagent: Aquamicron AX/CXU (supplied by Mitsubishi Chemical Corp.)
    Parameter: End Sense 0.1, Delay (VA) 2

(Analysis of Average Particle Size and Particle Size Distribution)

Ammonium chloride used in the Examples was of a special reagent grade (supplied by Wako Pure Chemical Industries, Ltd.), crushed in a dried atmosphere by a single track jet mill STJ-200™ supplied by Seishin Enterprise Co., Ltd. Average particle size and particle size distribution of ammonium chloride were determined by an SK Laser Micron Sizer LMS-300™ supplied by Seishin Enterprise Co., Ltd. under the following conditions.

Light source: Semiconductor laser (beam wavelength: 670 nm)
    Dispersant: Acetone
    Analytical procedure: Ammonium chloride (0.1 g) was suspended in 30 mL of acetone in a 100 mL beaker, and the suspension was treated ultrasonically for 3 minutes for preliminary dispersion and put in the dispersion tank of the particle size distribution analyzer, LMS-300.

Ammonium chloride was dried at 110° C. for 5 hours in a hot air drier before use.

(Estimation of Particle Size Distribution by the Rosin-Rammler Equation)

The particle size distribution data obtained by an LMS-300 analyzer tend to produce a straight line, when plotted on the Rosin-Rammler chart. These data were processed by the least square method for approximation to form a straight line, where the slope of the line gave the particle size distribution. (The particle size distribution estimated by the Rosin-Rammler equation is automatically calculated from the measurement results, when the distribution is determined by an LMS-300 analyzer).

EXAMPLE 1

A 100 mL four-necked flask equipped with a stirrer, cooling tube, dropping funnel and thermometer was charged with 1.93 g (0.036 moles) of ammonium chloride (average particle size: 2.1 μm, the value of particle size distribution estimated by the Rosin-Rammler equation: 3.5), 0.041 g (0.5 mmoles) of zinc oxide and 17 g of o-dichlorobenzene, which were kept in a flow of nitrogen. Part of the reaction solution was sampled by a microsyringe to determine its moisture content. It was $2.5 \times 10^{-4}$ as mole fraction based on the total moles of phosphorus pentachloride, later added to the reaction system ($2.5 \times 10^{-4}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 56 minutes via a dropping funnel kept at 105° C. Phosphorus pentachloride was provided for the reaction system at 0.89 moles/hour per mole of ammonium chloride incorporated beforehand into the reaction system.

On completion of the addition of phosphorus pentachloride, the reaction was allowed to proceed for 2 hours. Moisture content in the reaction system was observed during the reaction process not to exceed $2.5 \times 10^{-4}$ moles per mole of phosphorus pentachloride added to the reaction system. On completion of the reaction, unreacted ammonium chloride was removed by filtration, and the reaction solvent by vacuum distillation. This resulted in production of 3.46 g of the reaction product in a yield of 99.5% based on phosphorus pentachloride. The GPC results are given in Table 1.

EXAMPLE 2

A 100 mL four-mouthed flask equipped with a stirrer, cooling tube, dropping funnel and thermometer was charged with 1.93 g (0.036 moles) of ammonium chloride (average particle size: 2.1 μm, particle size distribution estimated by the Rosin-Rammler equation: 3.5), 0.041 g (0.5 mmoles) of zinc oxide and 15 g of monochlorobenzene, which were kept in a flow of nitrogen. Part of the reaction solution was sampled by a microsyringe to determine its moisture content. It was $3.2 \times 10^{-4}$ as mole fraction based on the total moles of phosphorus pentachloride, later added to the reaction system ($3.2 \times 10^{-4}$ moles per mole of phosphorus pentachloride).

Then, a solution of 6.25 g (0.03 moles) of phosphorus pentachloride dissolved in 15 g of monochlorobenzene was added dropwise to the reaction system, heated by an oil bath at 140° C. under reflux, in 50 minutes via a dropping funnel kept at 105° C. Phosphorus pentachloride was provided for the reaction system at 0.99 moles/hour per mole of ammonium chloride incorporated beforehand into the reaction system.

On completion of the addition of phosphorus pentachloride, the reaction was allowed to proceed for 2 hours. Moisture content in the reaction system was observed during the reaction process not to exceed $3.2 \times 10^{-4}$ moles per mole of phosphorus pentachloride added to the reaction system. On completion of the reaction, unreacted ammonium chloride was removed by filtration, and the reaction solvent by vacuum distillation. This resulted in production of 3.45 g of the reaction product in a yield of 99.2% based on phosphorus pentachloride. The GPC results are given in Table 1.

EXAMPLE 3

A 100 mL four-mouthed flask equipped with a stirrer, cooling tube, dropping funnel and thermometer was charged with 1.93 g (0.036 moles) of ammonium chloride (average particle size: 2.1 μm, particle size distribution estimated by the Rosin-Rammler equation: 3.5), 0.048 g (0.5 mmoles) of magnesium chloride and 17 g of o-dichlorobenzene, which were kept in a flow of nitrogen. Part of the reaction solution was sampled by a microsyringe to determine its moisture content. It was $2.8 \times 10^{-4}$ as mole fraction based on the total moles of phosphorus pentachloride, later added to the reaction system ($2.8 \times 10^{-4}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 49 minutes via a dropping funnel kept at 105° C. Phosphorus pentachloride was provided for the reaction system at 1.02 moles/hour per mole of ammonium chloride incorporated beforehand into the reaction system.

On completion of the addition of phosphorus pentachloride, the reaction was allowed to proceed for 2 hours. Moisture content in the reaction system was observed during the reaction process not to exceed $2.8 \times 10^{-4}$ moles per mole of phosphorus pentachloride added to the reaction system. On completion of the reaction, unreacted ammonium chloride was removed by filtration, and the reaction solvent by vacuum distillation. This resulted in production of 3.44 g of the reaction product in a yield of 98.9% based on phosphorus pentachloride. The GPC results are given in Table 1.

EXAMPLE 4

A 100 mL four-mouthed flask equipped with a stirrer, cooling tube, dropping funnel and thermometer was charged with 1.93 g (0.036 moles) of ammonium chloride (average particle size: 5.1 μm, particle size distribution estimated by the Rosin-Rammler equation: 2.8), 0.041 g (0.5 mmoles) of zinc oxide and 17 g of o-dichlorobenzene, which were kept in a flow of nitrogen. Part of the reaction solution was sampled by a microsyringe to determine its moisture content. It was $3.1 \times 10^{-4}$ as mole fraction based on the total moles of phosphorus pentachloride, later added to the reaction system ($3.1 \times 10^{-4}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 54 minutes via a dropping funnel kept at 105° C. Phosphorus pentachloride was provided for the reaction system at 0.92 moles/hour per mole of ammonium chloride incorporated beforehand into the reaction system.

On completion of the addition of phosphorus pentachloride, the reaction was allowed to proceed for 2 hours. Moisture content in the reaction system was observed during the reaction process not to exceed $3.1 \times 10^{-4}$ moles per mole of phosphorus pentachloride added to the reaction system. On completion of the reaction, unreacted ammonium chloride was removed by filtration, and the reaction solvent by vacuum distillation. This resulted in production of 3.41 g of the reaction product in a yield of 98.1% based on phosphorus pentachloride. The GPC results are given in Table 1.

EXAMPLE 5

A 100 mL four-mouthed flask equipped with a stirrer, cooling tube, dropping funnel and thermometer was charged with 1.93 g (0.036 moles) of ammonium chloride (average particle size: 2.1 μm, particle size distribution estimated by the Rosin-Rammler equation: 3.5), 0.041 g (0.5 mmoles) of zinc oxide, 0.30 g (3.8 mmoles) of pyridine and 17 g of o-dichlorobenzene, which were kept in a flow of nitrogen. Part of the reaction solution was sampled by a microsyringe to determine its moisture content. It was $2.7 \times 10^{-4}$ as mole fraction based on the total moles of phosphorus pentachloride, later added to the reaction system ($2.7 \times 10^{-4}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 62 minutes via a dropping funnel kept at 105° C. Phosphorus pentachloride was provided for the reaction system at 0.81 moles/hour per mole of ammonium chloride incorporated beforehand into the reaction system.

On completion of the addition of phosphorus pentachloride, the reaction was allowed to proceed for 2 hours. Moisture content in the reaction system was observed during the reaction process not to exceed $2.7 \times 10^{-4}$ moles per mole of phosphorus pentachloride added to the reaction system. On completion of the reaction, unreacted ammonium chloride was removed by filtration, and the reaction solvent by vacuum distillation. This resulted in production of 3.40 g of the reaction product in a yield of 97.8% based on phosphorus pentachloride. The GPC results are given in Table 1.

COMPARATIVE EXAMPLE 1

A 100 mL four-mouthed flask equipped with a stirrer, cooling tube, dropping funnel and thermometer was charged with 1.93 g (0.036 moles) of ammonium chloride (average particle size: 2.1 μm, particle size distribution estimated by the Rosin-Rammler equation: 3.5), 0.041 g (0.5 mmoles) of zinc oxide and 17 g of o-dichlorobenzene, which were kept in a flow of nitrogen. Part of the reaction solution was sampled by a microsyringe to determine its moisture content. It was $7.1 \times 10^{-3}$ as mole fraction based on the total moles of phosphorus pentachloride, later added to the reaction system ($7.1 \times 10^{-3}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 47 minutes via a dropping funnel kept at 105° C. Phosphorus pentachloride was provided for the reaction system at 1.06 moles/hour per mole of ammonium chloride incorporated beforehand into the reaction system.

On completion of the addition of phosphorus pentachloride, the reaction was allowed to proceed for 2 hours. On completion of the reaction, unreacted ammonium chloride was removed by filtration, and the reaction solvent by vacuum distillation. This resulted in production of 3.25 g of the reaction product in a yield of 93.5% based on phosphorus pentachloride. The GPC results are given in Table 2.

COMPARATIVE EXAMPLE 2

A 100 mL four-mouthed flask equipped with a stirrer, cooling tube, dropping funnel and thermometer was charged with 1.93 g (0.036 moles) of ammonium chloride (average particle size: 12.1 μm, particle size distribution estimated by the Rosin-Rammler equation: 2.2), 0.041 g (0.5 mmoles) of zinc oxide and 17 g of o-dichlorobenzene, which were kept in a flow of nitrogen. Part of the reaction solution was sampled by a microsyringe to determine its moisture content. It was $5.1 \times 10^{-4}$ as mole fraction based on the total moles of phosphorus pentachloride, later added to the reaction system ($5.1 \times 10^{-4}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 42 minutes via a dropping funnel kept at 105° C. Phosphorus pentachloride was provided for the reaction system at 1.19 moles/hour per mole of ammonium chloride incorporated beforehand into the reaction system.

On completion of the addition of phosphorus pentachloride, the reaction was allowed to proceed for 2 hours. On completion of the reaction, unreacted ammonium chloride was removed by filtration, and the reaction solvent by vacuum distillation. This resulted in production of 3.12 g of the reaction product in a yield of 89.7% based on phosphorus pentachloride. The GPC results are given in Table 2.

COMPARATIVE EXAMPLE 3

A 100 mL four-mouthed flask equipped with a stirrer, cooling tube, dropping funnel and thermometer was charged with 1.93 g (0.036 moles) of ammonium chloride (average particle size: 2.1 μm, particle size distribution estimated by the Rosin-Rammler equation: 3.5), 0.041 g (0.5 mmoles) of zinc oxide and 17 g of o-dichlorobenzene, which were kept in a flow of nitrogen. Part of the reaction solution was sampled by a microsyringe to determine its moisture content. It was $3.6 \times 10^{-4}$ as mole fraction based on the total moles of phosphorus pentachloride, later added to the reaction system ($3.6 \times 10^{-4}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 7 minutes via a dropping funnel kept at 105° C. Phosphorus pentachloride was provided for the reaction system at 7.1 moles/hour per mole of ammonium chloride incorporated beforehand into the reaction system.

On completion of the addition of phosphorus pentachloride, the reaction was allowed to proceed for 2 hours. On completion of the reaction, unreacted ammonium chloride was removed by filtration, and the reaction solvent by vacuum distillation. This resulted in production of 3.08 g of the reaction product in a yield of 88.6% based on phosphorus pentachloride. The GPC results are given in Table 2.

COMPARATIVE EXAMPLE 4

A 100 mL four-mouthed flask equipped with a stirrer, cooling tube, dropping funnel and thermometer was charged with 1.93 g (0.036 moles) of ammonium chloride (average particle size: 12.1 μm, particle size distribution estimated by the Rosin-Rammler equation: 2.2), 0.041 g (0.5 mmoles) of zinc oxide and 17 g of o-dichlorobenzene, which were kept in a flow of nitrogen. Part of the reaction solution was sampled by a microsyringe to determine its moisture content. It was $9.2 \times 10^{-3}$ as mole fraction based on the total moles of phosphorus pentachloride, later added to the reaction system ($9.2 \times 10^{-3}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 42 minutes via a dropping funnel kept at 105° C. Phosphorus pentachloride was provided for the reaction system at 1.19 moles/hour per mole of ammonium chloride incorporated beforehand into the reaction system.

On completion of the addition of phosphorus pentachloride, the reaction was allowed to proceed for 2 hours. On completion of the reaction, unreacted ammonium chloride was removed by filtration, and the reaction solvent by vacuum distillation. This resulted in production of 3.01 g of the reaction product in a yield of 86.6% based on phosphorus pentachloride. The GPC results are given in Table 2.

COMPARATIVE EXAMPLE 5

A 100 mL four-mouthed flask equipped with a stirrer, cooling tube, dropping funnel and thermometer was charged with 1.93 g (0.036 moles) of ammonium chloride (average particle size: 2.1 μm, particle size distribution estimated by the Rosin-Rammler equation: 3.5), 0.041 g (0.5 mmoles) of zinc oxide and 17 g of o-dichlorobenzene, which were kept in a flow of nitrogen. Part of the reaction solution was sampled by a microsyringe to determine its moisture content. It was $6.8 \times 10^{-3}$ as mole fraction based on the total moles of phosphorus pentachloride, later added to the reaction system ($6.8 \times 10^{-3}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 8 minutes via a dropping funnel kept at 105° C. Phosphorus pentachloride was provided for the reaction system at 6.25 moles/hour per mole of ammonium chloride incorporated beforehand into the reaction system.

On completion of the addition of phosphorus pentachloride, the reaction was allowed to proceed for 2 hours. On completion of the reaction, unreacted ammonium chloride was removed by filtration, and the reaction solvent by vacuum distillation. This resulted in production of 2.99 g of the reaction product in a yield of 86.0% based on phosphorus pentachloride. The GPC results are given in Table 2.

COMPARATIVE EXAMPLE 6

A 100 mL four-mouthed flask equipped with a stirrer, cooling tube, dropping funnel and thermometer was charged with 1.93 g (0.036 moles) of ammonium chloride (average particle size: 12.1 μm, particle size distribution estimated by the Rosin-Rammler equation: 2.2), 0.041 g (0.5 mmoles) of zinc oxide and 17 g of o-dichlorobenzene, which were kept in a flow of nitrogen. Part of the reaction solution was sampled by a microsyringe to determine its moisture content. It was $4.8 \times 10^{-4}$ as mole fraction based on the total moles of phosphorus pentachloride, later added to the reaction system ($4.8 \times 10^{-4}$ moles per mole of phosphorus pentachloride).

Then, a solution of 6.25 g (0.03 moles) of phosphorus pentachloride dissolved in 17 g of o-dichlorobenzene was added dropwise to the reaction system, heated by an oil bath at 177° C., in 8 minutes via a dropping funnel kept at 105° C. Phosphorus pentachloride was provided for the reaction system at 6.25 moles/hour per mole of ammonium chloride incorporated beforehand into the reaction system.

On completion of the addition of phosphorus pentachloride, the reaction was allowed to proceed for 2 hours. On completion of the reaction, unreacted ammonium chloride was removed by filtration, and the reaction solvent by vacuum distillation. This resulted in production of 3.03 g of the reaction product in a yield of 87.1% based on phosphorus pentachloride. The GPC results are given in Table 2.

COMPARATIVE EXAMPLE 7

A 100 mL four-mouthed flask equipped with a stirrer, cooling tube, dropping funnel and thermometer was charged with 1.93 g (0.036 moles) of ammonium chloride (average particle size: 2.1 μm, particle size distribution estimated by the Rosin-Rammler equation: 3.5), 0.041 g (0.5 mmoles) of zinc oxide, 0.30 g (3.8 mmoles) of pyridine and 15 g of monochlorobenzene, which were kept in a flow of nitrogen. Part of the reaction solution was sampled by a microsyringe to determine its moisture content. It was $8.2 \times 10^{-3}$ as mole fraction based on the total moles of phosphorus pentachloride, later added to the reaction system ($8.2 \times 10^{-3}$ moles per mole of phosphorus pentachloride).

Then, a solution of 6.25 g (0.03 moles) of phosphorus pentachloride dissolved in 15 g of monochlorobenzene was added dropwise to the reaction system, heated by an oil bath at 140° C. under reflux, in 52 minutes via a dropping funnel kept at 105° C. Phosphorus pentachloride was provided for the reaction system at 0.96 moles/hour per mole of ammonium chloride incorporated beforehand into the reaction system.

On completion of the addition of phosphorus pentachloride, the reaction was allowed to proceed for 2 hours. On completion of the reaction, unreacted ammonium chloride was removed by filtration, and the reaction solvent by vacuum distillation. This resulted in production of 3.24 g of the reaction product in a yield of 93.2% based on phosphorus pentachloride. The GPC results are given in Table 2.

It is apparent, by comparing the results of the Examples (Table 1) with those of the Comparative Examples (Table 2), that the cyclic chlorophosphazene oligomers are produced in a high yield based on phosphorus pentachloride, and that the trimer and tetramer in the products are obtained in a high yield and selectivity, when 1) moisture content in the reaction system is $5 \times 10^{-3}$ or less as mole fraction based on the total moles of phosphorus chloride added to the reaction system ($5 \times 10^{-3}$ moles or less per mole of phosphorus chloride), and
2) the ammonium chloride has an average particle size of 10 μm or less and particle size distribution estimated by the Rosin-Rammler equation of 2 or more.

TABLE 1

| | | Ammonium chloride | | | | Compositional ratio (%) | | |
| --- | --- | --- | --- | --- | --- | --- | --- | --- |
| | | | Average | | | | | |
| Example | Catalyst | Moisture content (moles)* | particle size (μm) | particle size distribution | Yield (%) | Trimer | Tetramer | Pentamer and higher |
| 1 | ZnO | $2.5 \times 10^{-4}$ | 2.1 | 3.5 | 99.5 | 80.4 | 15.3 | 4.3 |
| 2 | ZnO | $3.2 \times 10^{-4}$ | 2.1 | 3.5 | 99.2 | 67.6 | 21.2 | 11.2 |
| 3 | MgCl$_2$ | $2.8 \times 10^{-4}$ | 2.1 | 3.5 | 98.9 | 81.4 | 14.9 | 3.7 |
| 4 | ZnO | $3.1 \times 10^{-4}$ | 5.1 | 2.8 | 98.1 | 78.2 | 14.9 | 6.9 |
| 5 | ZnO | $2.7 \times 10^{-4}$ | 2.1 | 3.5 | 97.8 | 83.2 | 9.5 | 7.3 |

*Moles of water per mole of chlorinated phosphorus

TABLE 2

| | | Ammonium chloride | | | | Compositional ratio (%) | | |
| --- | --- | --- | --- | --- | --- | --- | --- | --- |
| | | | Average | | | | | |
| Comparative Example | Catalyst | Moisture content (moles)* | particle size (μm) | particle size distribution | Yield (%) | Trimer | Tetramer | Pentamer and higher |
| 1 | ZnO | $7.1 \times 10^{-3}$ | 2.1 | 3.5 | 93.5 | 69.2 | 18.1 | 12.5 |
| 2 | ZnO | $5.1 \times 10^{-4}$ | 12.1 | 2.2 | 89.7 | 70.3 | 16.2 | 13.3 |
| 3 | ZnO | $3.6 \times 10^{-4}$ | 2.1 | 3.5 | 88.6 | 71.5 | 15.1 | 12.8 |
| 4 | ZnO | $9.2 \times 10^{-3}$ | 12.1 | 2.2 | 86.6 | 63.1 | 21.3 | 14.2 |
| 5 | ZnO | $6.8 \times 10^{-3}$ | 2.1 | 3.5 | 86.0 | 65.2 | 19.1 | 15.2 |
| 6 | ZnO | $4.8 \times 10^{-4}$ | 12.1 | 2.2 | 87.1 | 66.7 | 18.2 | 14.6 |
| 7 | ZnO | $8.2 \times 10^{-3}$ | 2.1 | 3.5 | 93.2 | 73.2 | 3.2 | 0.8 |

*Moles of water per mole of chlorinated phosphorus

The method of the present invention for producing cyclic chlorophosphazene oligomers can produce cyclic chlorophosphazene trimer and tetramer in a high yield and selectivity.

The as-produced cyclic chlorophosphazene oligomers produced by the method of the present invention or derivatives thereof can be used in widely varying areas, e.g., plastics and additives therefor, rubbers, fertilizers and medicines.

What is claimed is:

1. A method for producing cyclic chlorophosphazene oligomers, comprising the reaction between chlorinated phosphorus and ammonium chloride in the presence of a reaction catalyst, wherein
   1) moisture is present in the reaction system at a molar fraction of $5\times10^{-3}$ or less based on the total moles of chlorinated phosphorus provided for the reaction system, and
   2) the ammonium chloride has an average particle size of 10 μm or less and the value of particle size distribution of 2 or more, estimated by the Rosin-Rammler equation.

2. The method for producing cyclic chlorophosphazene oligomers according to claim 1, wherein moisture is present in the reaction system at a molar fraction of $1\times10^{-3}$ or less based on the total moles of said chlorinated phosphorus provided for the reaction system.

3. The method for producing cyclic chlorophosphazene oligomers according to claim 1, wherein said ammonium chloride has an average particle size of 2.5 μm or less.

4. The method for producing cyclic chlorophosphazene oligomers according to claim 1 comprising adding said chlorinated phosphorus to said ammonium chloride incorporated beforehand into the reaction system, wherein said chlorinated phosphorus is provided for the reaction system at $5\times10^{-2}$ to 5 moles/hour per mole of said ammonium chloride incorporated beforehand into the reaction system.

5. The method for producing cyclic chlorophosphazene oligomers according to claim 1 comprising adding said chlorinated phosphorus to said ammonium chloride incorporated beforehand into the reaction system, wherein said chlorinated phosphorus is provided for the reaction system at 0.1 to 2 moles/hour per mole of said ammonium chloride incorporated beforehand into the reaction system.

6. The method for producing cyclic chlorophosphazene oligomers according to claim 1, wherein at least one reaction solvent selected from the group consisting of monochlorobenzene and dichlorobenzene is used.

7. The method for producing cyclic chlorophosphazene oligomers according to claim 1, wherein dichlorobenzene is used as a reaction solvent.

* * * * *